United States Patent
Wen (10) Patent No.: US 6,356,661 B1
(45) Date of Patent: Mar. 12, 2002

(54) METHOD AND DEVICE FOR ROBUST DECODING OF HEADER INFORMATION IN MACROBLOCK-BASED COMPRESSED VIDEO DATA

(75) Inventor: Jiangtao Wen, Pasadena, CA (US)

(73) Assignee: M4 Labs, INC, San Diego, CA (US)

( * ) Notice: Subject to any disclaimer, the term of this patent is extended or adjusted under 35 U.S.C. 154(b) by 0 days.

(21) Appl. No.: 09/226,227

(22) Filed: Jan. 7, 1999

(51) Int. Cl.[7] .................................................. G06K 9/46
(52) U.S. Cl. ....................................... 382/233; 382/232
(58) Field of Search ................................. 382/232, 233, 382/234, 235, 236, 237, 238, 239, 240, 241, 242, 248; 370/218, 252, 253, 277, 278, 282, 342, 349

(56) References Cited

U.S. PATENT DOCUMENTS

| | | | |
|---|---|---|---|
| 5,440,572 A | 8/1995 | Kitaori | 371/43 |
| 5,629,958 A | 5/1997 | Willming | 375/295 |
| 5,642,437 A * | 6/1997 | Laczko, Sr. et al. | 382/246 |
| 5,668,925 A | 9/1997 | Rothweiler et al. | |
| 5,724,369 A * | 3/1998 | Brailean et al. | 371/31 |
| 5,767,799 A | 6/1998 | Martens et al. | 341/67 |
| 5,778,191 A * | 7/1998 | Levine et al. | 395/200 |
| 5,825,425 A | 10/1998 | Kazui et al. | 348/420 |
| 5,867,221 A * | 2/1999 | Pullen et al. | 348/417 |
| 5,963,596 A * | 10/1999 | Benbassat et al. | 375/243 |
| 6,141,453 A * | 10/2000 | Banham et al. | 382/240 |

OTHER PUBLICATIONS

Forney, Jr., David G., "The Viterbi Algorithm," *Proceedings of the IEEE*, 61:(3):265–278, (1973).

* cited by examiner

*Primary Examiner*—Phuoc Tran
*Assistant Examiner*—Amir Alavi
(74) *Attorney, Agent, or Firm*—Kevin J Zimmer (57) ABSTRACT

A method and apparatus for decoding encoded parameter data included within a packet containing encoded video data transmitted over an error prone channel is disclosed herein. The method contemplates determining a bit length L of the encoded parameter data. Candidate sequences of codewords are then compared to the encoded parameter data in accordance with a predetermined distortion metric. An optimized sequence is selected from the candidate sequences based upon predefined criteria related to the distortion metric. The optimized sequence collectively has a number of bits equivalent to the bit length L and is usable in decoding the encoded video data.

19 Claims, 7 Drawing Sheets

| 0 | 1 | 1 |
|---|---|---|
| "A" | "C" | |

FIG. 4(a)

| 0 | 0 | 1 |
|---|---|---|
| "A" | "A" | ? |

FIG. 4(b)

| Codeword | Symbol |
|---|---|
| 0 | A |
| 10 | B |
| 11 | C |

METHOD AND DEVICE FOR ROBUST DECODING OF HEADER INFORMATION IN MACROBLOCK-BASED COMPRESSED VIDEO DATA

FIELD OF THE INVENTION

The present invention relates to the recovery of compressed digital data, and more particularly, to a device and method for decoding header information in macroblock-based encoded digital signals transmitted over error-prone channels.

BACKGROUND OF THE INVENTION

Recently, demands for full motion video in such applications as video telephony, video conferencing, and/or multimedia applications have required that standards be introduced for motion video on computer and related systems. Such applications have required development of compression techniques which can reproduce the amount of data required to represent a moving image and corresponding sound to manageable lengths in order to, for example, facilitate data transmission using conventional communications hardware.

Variable-length coding is a coding technique often used for lossless data compression. In accordance with this technique, an 8×8 block of pixels of the video data is converted into discrete cosine transform ("DCT") coefficients. The DCT coefficients are then quantized by quantization factors. The quantized DCT coefficients are Huffman encoded to form Huffman codewords. Such an encoding of the video data contained in the bitstreams is commonly used to construct a minimum redundant variable-length code for a known data statistic.

One set of standards using Huffman encoding for compression of motion picture video images for transmission or storage is known as the Motion Picture Experts Group ("MPEG") set of standards. Each MPEG standard is an international standard for the compression of motion video pictures and audio. The MPEG standards allow motion picture video to be compressed along with the corresponding high quality sound and provide other features such as single frame advance, reverse motion, and still frame video.

The decoding and processing of the MPEG video bitstreams are critical to the performance of any MPEG decoding system. The compressed MPEG video bitstreams contain the various parameters needed in the reconstruction of the audio and video data. The MPEG bitstream can easily be divided into two bitstreams, audio and video. The MPEG video bitsream consists of the video parameters, as well as the actual compressed video data.

Two versions of the MPEG video standard which have received widespread adoption are commonly known as the MPEG-1 and MPEG-2 standards. In general, the MPEG-2 standard has higher resolution than the MPEG-1 standard and enables broadcast transmission at a rate of 4–6 Mbps. In addition to the MPEG-1 and MPEG-2 standards, a proposed MPEG-4 standard is currently being standardized by the ISO/IEC. The MPEG4 standard is intended to facilitate, for example, content-based interactivity and certain wireless applications.

The video codecs specified by the standards provide compression of a digital video sequence by utilizing a block motion-compensated DCT. In a first block-matching step of the DCT process, an algorithm estimates and compensates for the motion that occurs between two temporally adjacent frames. The frames are then compensated for the estimated motion and compared to form a difference image. By taking the difference between the two temporally adjacent frames, all existing temporal redundancy is removed. The only information that remains is new information that could not be compensated for in the motion estimation and compensation algorithm.

In a second step, this new information is transformed into the frequency domain using the DCT. The DCT has the property of compacting the energy of this new information into a few low frequency components. Further compression of the video sequence is obtained by limiting the amount of high frequency information encoded.

The majority of the compression provided by this approach to video encoding is obtained by the motion estimation and compensation algorithm. That is, it has been found to be more efficient to transmit information regarding the motion that exists in a video sequence, as opposed to information about the intensity and color. The motion information is represented using vectors which point from a particular location in the current intensity frame to where that same location originated in the previous intensity frame. For block-matching, the locations are predetermined non-overlapping blocks of equal size called macroblocks ("MBs"). All pixels contained in a MB are assumed to have the same motion. The motion vector associated with a particular MB in the present frame of a video sequence is found by searching over a predetermined search are in the previous temporally adjacent frame for a best match. The motion vector points from the center of the MB in the current frame to the center of the block which provides the best match in the previous frame.

Utilizing the estimated motion vectors, a copy of the previous frame is altered by each vector to produce a prediction of the current frame. This operation is referred to as motion compensation. As described above, each predicted MB is subtracted from the current MB to produce a differential MB which is transformed into the spatial frequency domain by the DCT. These spatial frequency coefficients are quantized and entropy encoded providing further compression of the original video sequence. The motion vectors are compressed using differential pulse code modulation ("DCPM"), and entropy encoding. Both the motion vectors and the DCT coefficients are transmitted to the decoder, where the inverse operations are performed to produce the decoded video sequence. Because the video codecs specified by the standards are very efficient at removing all but the most essential information, any errors in the reconstruction process effected by the decoder result in a portion of the video being constructed incorrectly.

Efforts have been made to design the MPEG4 standard to be particularly robust in its ability to accommodate transmission errors in order to allow accessing of image or video information over a wide range of storage and transmission media. In this regard a number of different types of tools have been developed to enhance the error resiliency of the MPEG4 standard. These tools may be characterized as relating to resynchronization, data recovery and error concealment. In a particular error resilient mode of the MPEG4 standard, fixed length packets separated by resynchronization markers are used to transmit the video data. Within each packet, header information for the packet is placed in an initial packet segment and the actual encoded video data occupies the remainder of the packet. Information contained in the header portion of the packet includes and index to the first MB in the packet, quantization information, information concerning macroblock type and coded block pattern for chrominance ("MCBPC"), and motion information.

Detection, location and correction of any errors present in the header information is crucial to ensuring that the decoded video information is of sufficient quality. This is particularly important in the context of wireless communication systems, which operate in particularly error-prone environments.

SUMMARY OF THE INVENTION

Briefly, therefore, this invention provides for a method and apparatus for decoding encoded parameter data included within a packet containing encoded video data. The inventive method contemplates determining, from information within the packet, a bit length L of the encoded parameter data. A number N of codewords for use in decoding the encoded parameter data is also determined. Candidate sequences of N codewords are then compared to the encoded parameter data in accordance with a predetermined distortion metric. An optimized sequence of N codewords is selected from the candidate sequences based upon pre-defined criteria related to the distortion metric. The optimized sequence collectively has a number of bits equivalent to the bit length L and is usable in decoding the encoded video data.

A first of the candidate sequences of N codewords is preferably generated by selecting a first codeword hypothesis and determining a first conditionally optimal sequence of N−1 codewords associated with the first codeword hypothesis. Other candidate sequences are then generated by selecting different codeword hypotheses and determining associated conditionally optimal sequences of N−1 codewords.

DETAILED DESCRIPTION OF THE INVENTION

Figure 1:
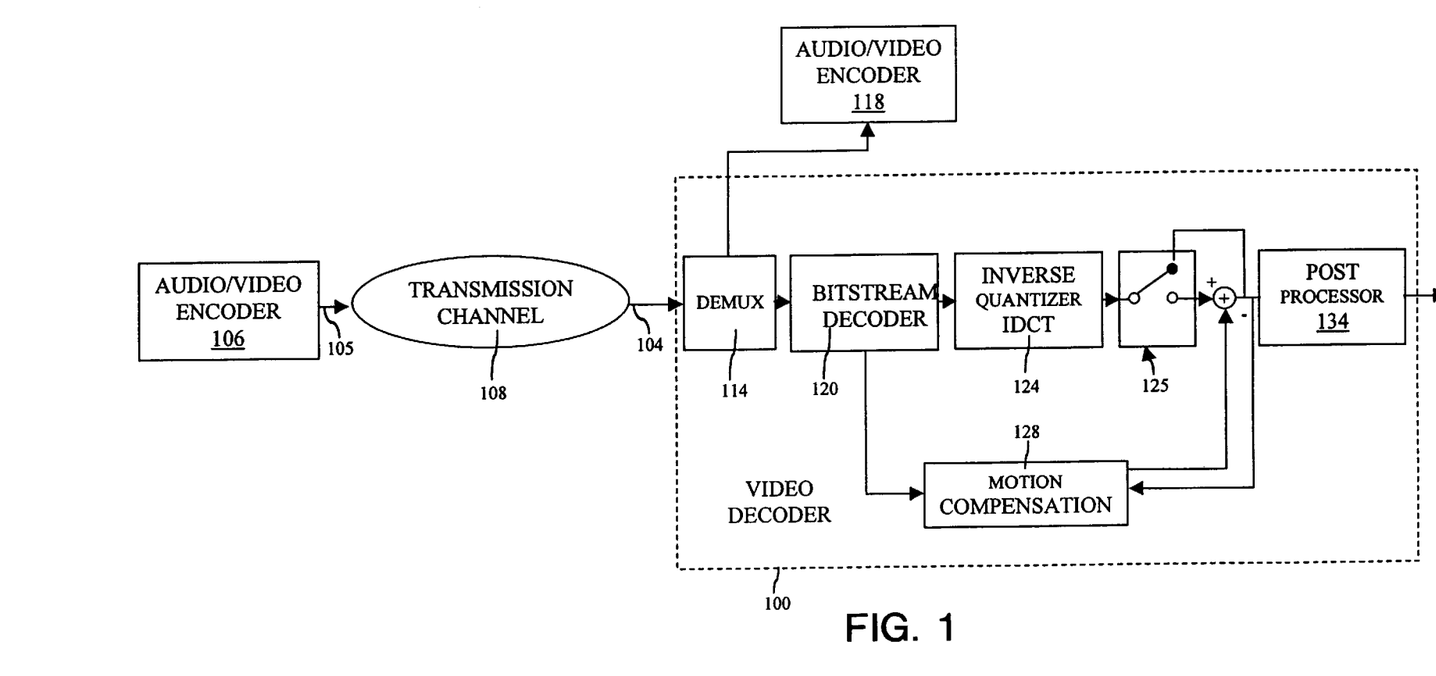
FIG. 1 is a block diagram of a video decoder operative to decode packet header data in accordance with the dynamic soft decoding technique of the present invention.

The present invention is more fully described with reference to FIGS. 1–6. FIG. 1 is a block diagram of a data transmission system which includes a video decoder 100 operative in the manner described herein. The video decoder 100 functions to decode packet header data within encoded video packets contained within a received bitstream 104 using the dynamic soft decoding technique of the present invention. As is indicated by FIG. 1, a multiplexed audio and video bitstream 105 generated by an audio/video encoder 106 is provided via transmission channel 108 to the video decoder 100. Due to the unreliable nature of the transmission channel 108 errors are introduced into the bitstream 105, which results in particular bits of the received bitstream 104 differing from corresponding bits in the transmitted bitstream 105. If the video decoder 100 were to blindly employ a hard-decision based decoding algorithm, these errors could have a disastrous effect on the visual quality of the resulting video. In order to avoid such a result, header data within each packet of the received bitstream 104 is decoded in the manner described below.

The video decoder 100 includes a demultiplexer 114 for separating encoded audio information from encoded video information included within the received bitstream 104. The encoded audio bitstream is provided to an audio decoder 118, while the encoded video bitstream is provided to a video bitstream decoder 120. Within the video bitstream decoder 120, the header of each packet of encoded video information is decoded in accordance with the present invention. Once the header of a given packet has been decoded, the resultant decoding parameters are used to decode the encoded video information within the macroblocks included in such packet. The decoded video data is then provided to a conventional inverse quantizer and inverse DCT module 124. When motion compensation is desired to be effected, a controller (not shown) sets switch 125 such that the output of the inverse DCT module 124 is modified by a motion compensation module 128 at difference block 130. The motion compensated video bitstream produced by the difference block 130 is fed back to the motion compensation module 128, and is provided to a standard postprocessor unit 134. When motion compensation is not desired, the controller sets switch 125 such that the output of the inverse DCT module 124 is provided directly to the postprocessor 134.

Figure 2:
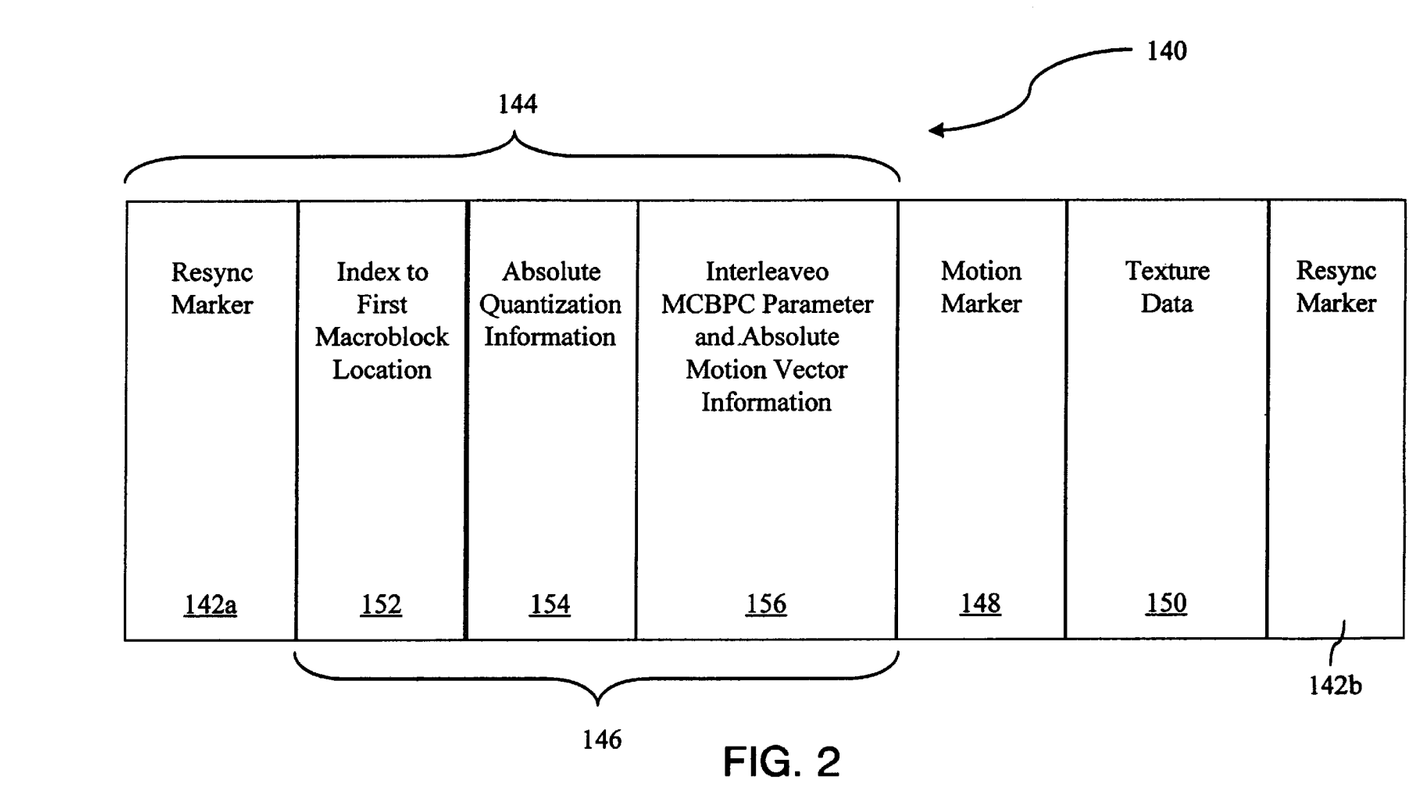
FIG. 2 provides a diagrammatic representation of an exemplary encoded video packet included within the bitstream provided to the video decoder of FIG. 1.

FIG. 2 provides a diagrammatic representation of an exemplary encoded video packet 140 included within the bitstream 104 provided to the video decoder 100. In an exemplary implementation, the encoder 106 places resynchronization markers 142a, 142b at approximately evenly spaced (in terms of bits) locations within the bitstream 104. Each resynchronization marker 142 defines the beginning of an individual video packet. Within encoder 106, successive macroblocks within a given video packet are encoded until the number of bits included in such packet exceeds a predetermined threshold. At this point a new video packet is created, and a resynchronization marker inserted, upon beginning encoding of the next macroblock.

The video packet 140 includes header information 144, which consists of the resynchronization marker 142a and other packet control information 146 necessary for restarting the decoding process. The packet control information 146 is separated by a motion marker 148 from the remainder of the packet 140, which contains texture information 150 in the form of encoded macroblocks. The packet control information 146 includes an index 152 to the location of the first macroblock in the packet 140, absolute quantization information 154, and interleaved COD and MCBPC Parameters and absolute motion vector information 156. The quantization information 154 enables the differential decoding process to be restarted at the location of the first macroblock specified by the index 152. The partitioning of texture information 150 and COD/MCBPC/motion information 156 allows such information to be used in concealing errors which would otherwise arise as a result of loss of any texture information 150. As is described hereinafter, the COD/MCPBC/motion information within the header information 144 of each packet 140 comprises a concatenated sequence of codewords useful in decoding the macroblocks of such packet 140.

As mentioned in the Background of the Invention, differential encoding is used to represent motion vectors associated with particular macroblocks. Upon resynchronization of the decoder 100 at each resynchronization marker 142, absolute values of motion vectors and of other information (e.g., quantization factors) associated with the immediately preceding video packet is extracted from the header information 144. Accordingly, if the video packet immediately preceding the packet 140 is lost, the values of the motion vectors and quantization factors for the first macroblock of the packet 140 can be obtained by finding the sum of the absolute values of these parameters for the immediately preceding packet and the differential values for these parameters associated with the first macroblock.

Figure 3:
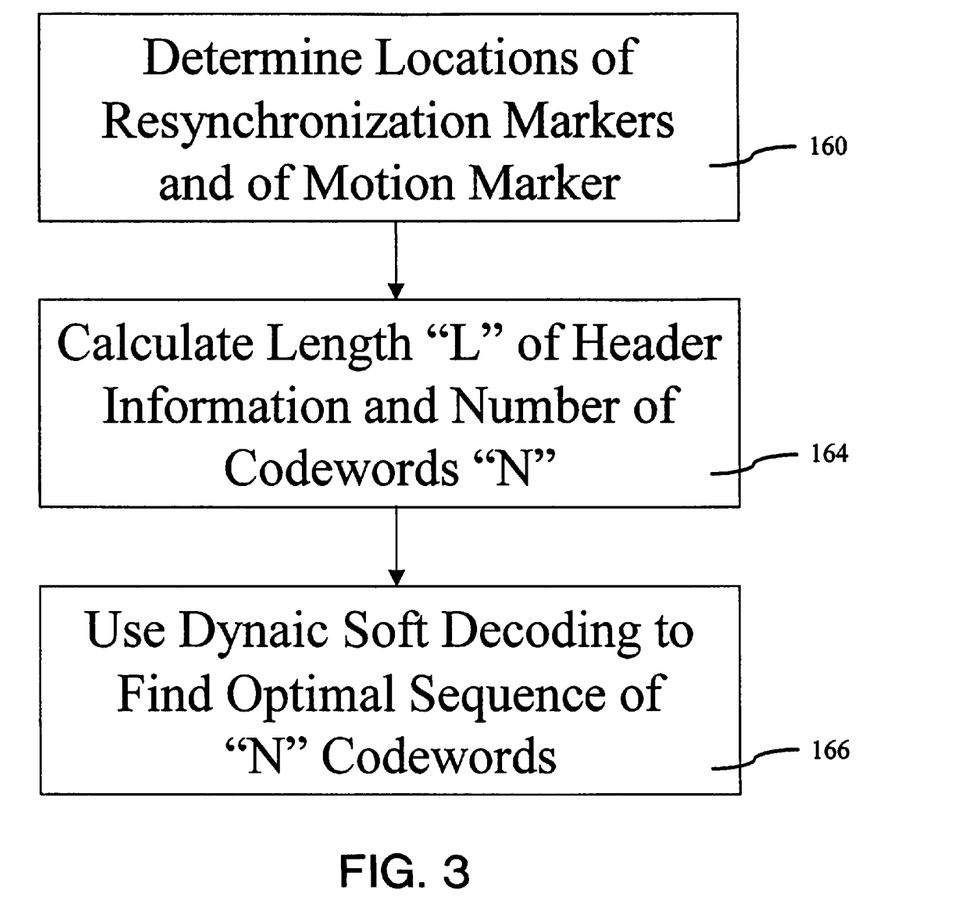
FIG. 3 is a generalized flow diagram of a preferred embodiment of a method for dynamic soft decoding of header information included within an encoded video packet.

FIG. 3 is a generalized flow diagram of a preferred embodiment of a method for dynamic soft decoding of header information included within the encoded video packet 140. In an initial step 160 the locations of the resynchronization markers 142a and 142b, and of the motion marker 148, are identified. Next, in step 164 the length "L" (in bits) of the header information 144 is determined by comparing the locations of the motion marker 148 and the resynchronization marker 142a. The number "N" of codewords to be used in decoding the texture informtion 150 is then determined by examining, i.e., comparing the relative values of, the indices to the first MBs in the current and subsequent packets. In step 166, a sequence of "N" codewords which contains L bits and which corresponds to the decoded header information for the packet 140 is found in accordance with the dynamic soft decoding technique described below.

In accordance with the present invention, an optimal decoding of the header information 144 into "N" codewords spanning "L" bits is given by D*(N,L), where $$D^*(N,L)=D^*(N-1,L-l_{H^*(1)})+H^*(1), \quad (1)$$

$$H^*(1)=\arg\min_{i=1,\ldots,K} D^*(N-1,L-l_{H(1)})+\text{Dist}(MCBPC_1=i). \quad (2)$$

wherein H*(1) is the first codeword within an optimum sequence of codewords defined by D*(N,L), $l_{H^*(1)}$ is the number of bits included within H*(1), K is the number of codewords in the encoding system being utilized, and Dist (MCBPC$_1$=i) is a measure of the distance or distortion between the bitstream 104 and the most closely matching concatenation of codewords when the i$^{th}$ codeword is assumed to be the first codeword in the video packet 140. The distance or distortion metric Dist(.) can be be a hard-decision based metric (e.g., Hamming distance), or can be a soft-decision based metric in cases where the bitstream decoder 120 is provided with some indication of the reliability of particular bits in the bitstream 104. Such an indication could be provided by, for example, a channel decoder having access to channel quality information. It follows that the optimal decoding result, D*(N,L), is the sequence of available codewords defining a bit pattern which minimizes a predefined distance metric when compared to the bitstream 104.

Figure 4:
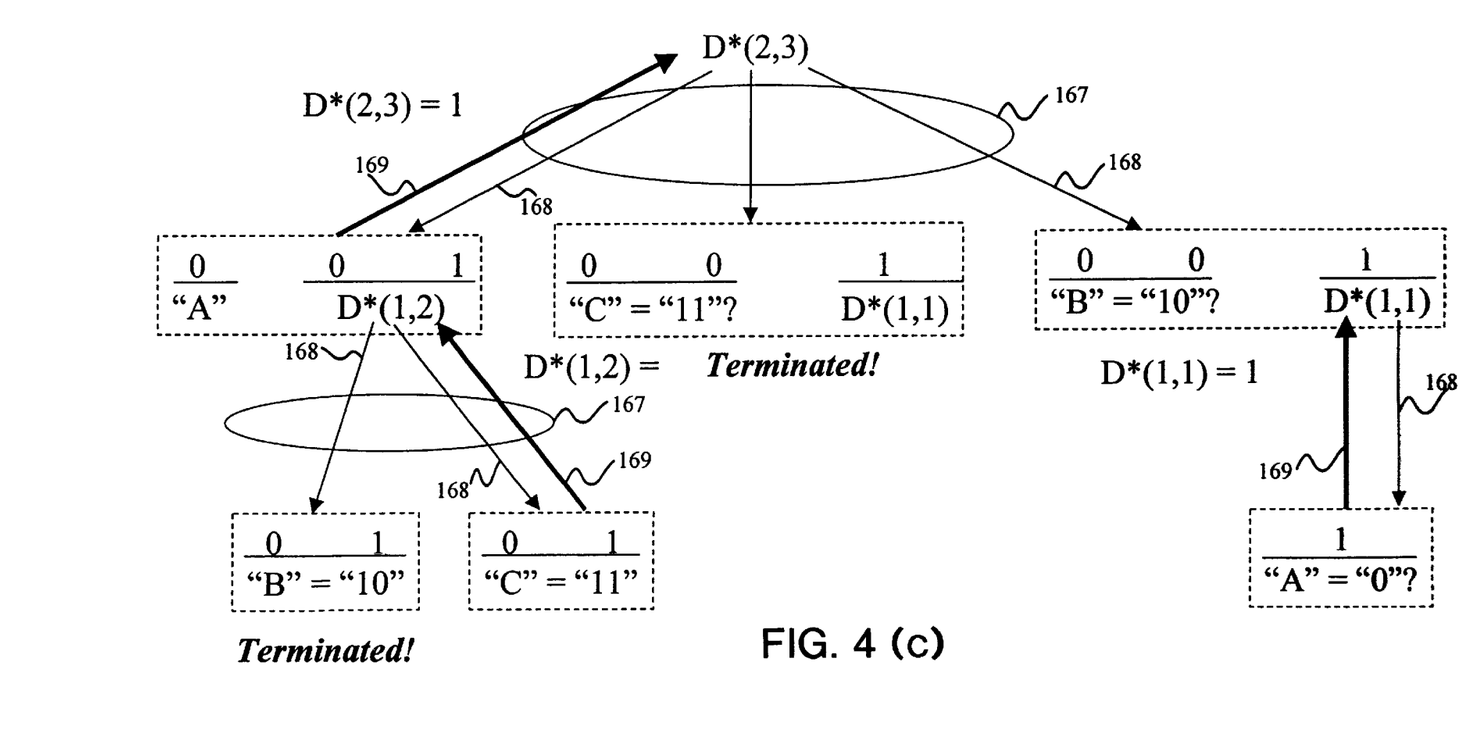
FIGS. 4(a)–4(c) illustratively provide an example of the dynamic soft decoding of a packet header within the context of a simplified encoding system.
FIG. 4(d) is a code table containing three codewords referred to in the example represented by FIGS. 4(a)–4(c).
Figure 4A:
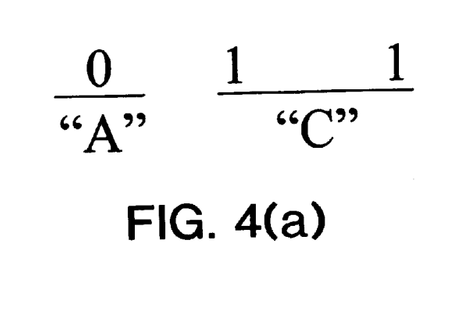
Figure 4B:
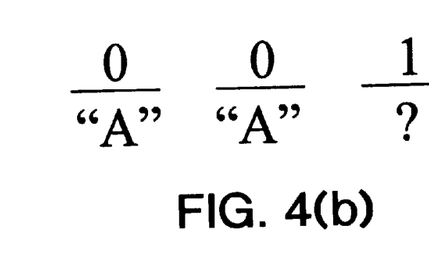
Figure 4D:
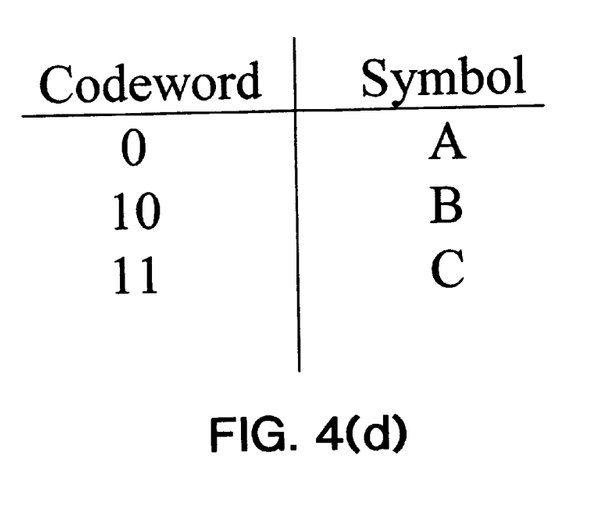

FIGS. 4(a)–4(c) illustratively provide an example of the dynamic soft decoding of packet header data in accordance with the present invention in the context of a simplified three-codeword encoding system. FIG. 4(d) is a code table containing the three codewords, {"A"="0", "B"="10", "C"="11"}, of the simplified encoding system. Referring to FIG. 4(a), consider a transmitted bitstream 105 which includes a 3-bit packet "011" corresponding to the message "AC" (L=3, N=2). Also suppose that this packet is corrupted by the transmission channel 108 and received as the packet "001" is received at the decoder 100 (FIG. 4(b)). In this case a conventional hard-decision, look-up-based decoder will output "AA" and then detect an error upon encountering a single "1" at the end of the packet. As is indicated by FIG. 4(b), such an error is detected because a single "1" is not a codeword included within the code table of FIG. 4(d).

FIG. 4(c) illustratively represents the inventive dynamic soft decoding process and corresponding results in the context of the present example. In FIG. 4(c), the oval-shaped closed curves 167 indicate that a choice is to be made among the operations represented by the arrowed lines encircled thereby. The thin arrowed lines 168 designate possible decompositions of the original opitmization problem D*(N, L). Optimal results returned by lower-level operations performed during the process of determining D*(N,L) are represented by thicker arrowed lines 169.

As is indicated by FIG. 4(c), applying equations (1) and (2) to the present example results in $$D^*(N,L)=D^*(2,3)=D^*(1,3-l_{H^*(1)})+H^*(1), \quad (3)$$

$$H^*(1)=\arg\min_{i=1,2,3} D^*(1,3-l_{H(1)})+\text{Dist}(\text{codeword}_1=i) \quad (4)$$

If it is assumed that the distance metric Dist(.) in equation (4) is the Hamming distance (i.e. the total number of different bits in the decoded and received bit sequence), then for the received packet "001" equation (4) involves finding $$\text{Min}\{D^*(1,2)+0, D^*(1,1)+1, D^*(1,1)+2\}. \quad (5)$$

where (5) corresponds to the optimization involved when the first codeword in the packet is assumed to be A, B and C respectively. With regard to the first term in (5), Dist(A)=0 since the first received bit in the packet "001" is "0", and from FIG. 4(d) the value of "A" is also "0". The values for Dist(B)=1 and Dist(C)=2 may be obtained similarly. Since D*(1,1)+1 is clearly less than D*(1,1)+2, (5) is equivalent to finding $$\text{Min}\{D^*(1,2)+0, D^*(1,1)+1\}, \quad (6)$$

That is, the reduction of expression (5) into expression (6) indicates that if the first codeword in the packet is a 2-bit code word it should be "B" rather than "C". The bitstream decoder 120 is operative to decompose the problem posed by (6) by finding D*(1,2) and D*(1,1), with respect to the last two bits in the received packet "001", using equations (1) and (2). By comparing the last two bits in the received packet "001" to the code table of FIG. 4(d), it is clear that D*(1,2)=1 (i.e. the Dist(.) metric is minimized and equal to "1" when the last two bits "01" in the received packet "001" are assumed to be the 2-bit code word "C"="11"). Performing the same type of comparison yields D*(1,1)=1 (i.e. the last bit in the received packet "001" has a value of "1" and is a distance of "1" away from the only 1-bit code word in the code table of FIG. 4(d), "A"=0). Inserting D*(1,2)=1 and D*(1,1)=1 into (6) gives $$D^*(2,3)=\text{Min}\{D^*(1,2)+0, D^*(1,1)+1\}=\text{Min}\{1, 2\}, \quad (7)$$

It follows that in the present example the optimal decoding result, D*(2,3), is equivalent to D*(1,2)+0, which has been shown to minimize (7) and be of value "1". Since the term D*(1,2)+0 arises in equations (6) and (7) under the assumption that the first codeword is "A", and since (7) is minimized when the last codeword in the received packet is "C", the optimal decoding result in the present example is "AC".

Figure 5:
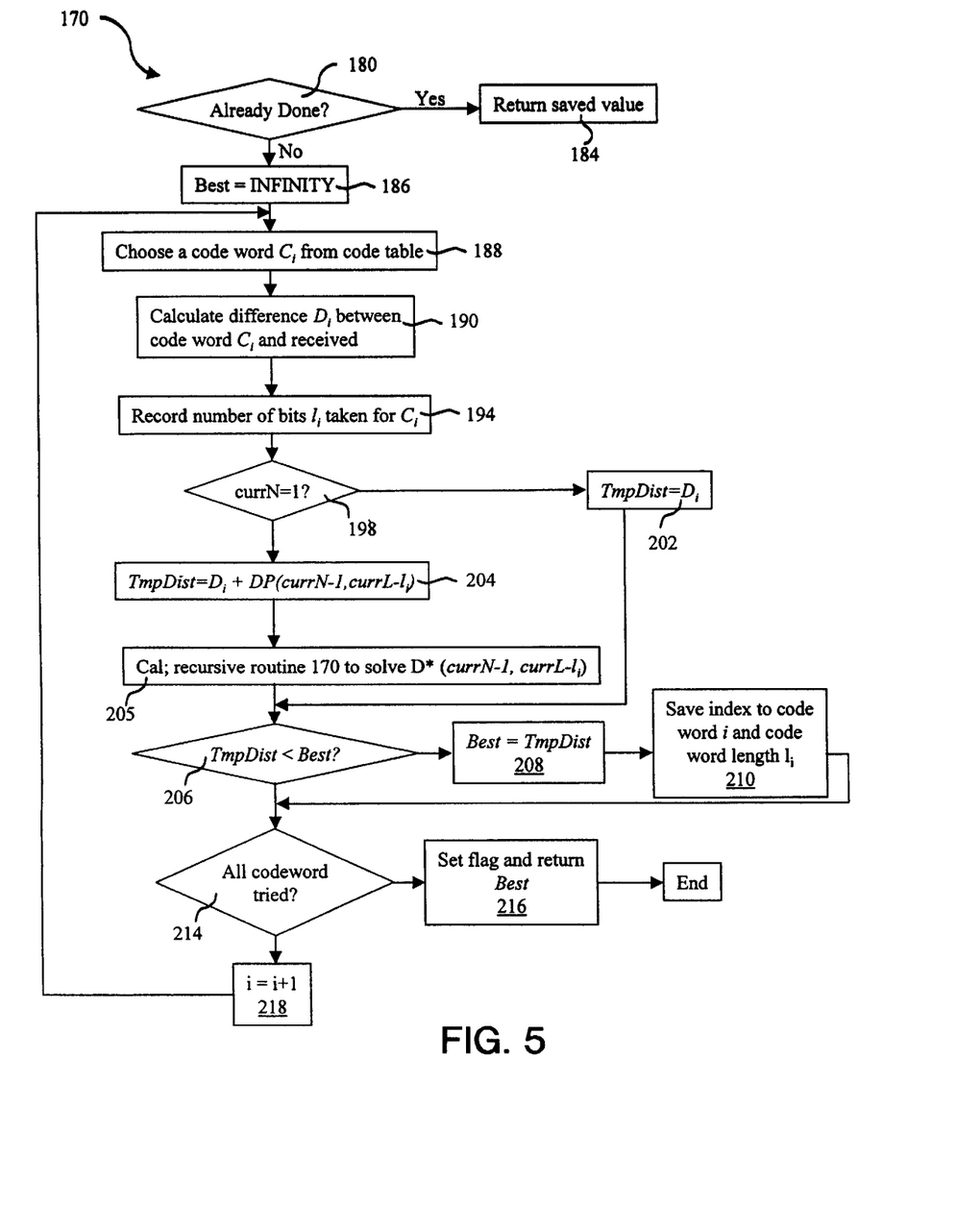
FIG. 5 is a flow diagram representative of a preferred recursive routine disposed to implement the dynamic soft decoding procedure of the present invention.

FIG. 5 is a flow diagram representative of a preferred recursive routine 170 disposed to implement the dynamic soft decoding procedure of the present invention. In FIG. 5 it is assumed that all operations in FIG. 3 have been performed on the received packet header information except for step 166. That is, the procedure of FIG. 5 is used to find the optimal decoding result D*(currN=N,currL=L) once the bit length L of the packet header information 144 and the number of codewords N to be included in the decoded header information have been determined as described above.

Referring to FIG. 5, in step 180 it is determined whether D*(currN, currL) has already been obtained when the recursive routine 170 was initially called (with a reduced currN and currL) in connection with solution of the original problem D*(N,L) corresponding to the entirety of the packet being decoded. If so, the saved result D*(currN, currL) is returned (step 184) and decoding of the header information within the next received video packet is commenced. If not, a parameter Best is set to an infinite value in a step 186 and a codeword $C_i$ is selected from a table of available codewords (e.g., see FIG. 4(d)) in step 188.

In step 190, a difference $D_i$ is calculated by comparing the bits of the selected codeword $C_i$ to the first l bits in the header information of the received packet in accordance with the applicable distance metric. This bit length l is recorded in step 194, and corresponds to the bit length of the selected codeword $C_i$. If the number N of codewords is one (step 198), then a temporary variable TmpDist is assigned the value of the difference $D_i$ (step 202). If the number N of codewords is not equal to one, then TmpDist is assigned the value of $D_i$+D*(currN-1, currL-l) (step 204). In this case the recursive routine 170 is again called to evaluate D*(currN-1, currL-l) in the manner contemplated by FIG. 5 (step 205). Once this called instance of routine 170 has evaluated D*(currN-1, currL-l), which may involve making one or more further calls to the recursive routine 170, a corresponding value of TmpDist is returned. The originally calling instance of routine 170 then determines whether the returned value for TmpDist is less than the current value of Best (step 206). If so, the value of Best is set to the current value of TmpDist (step 208), and the index "i" of $C_i$ is saved along with the bit length l of $C_i$ (step 210).

As is indicated by FIG. 5, in step 214 it is determined whether the routine 170 has evaluated D*(N, L) using each of the K available codewords ($C_1$, $C_2$, ..., $C_K$) as the first codeword in the decoded sequence. If so, a flag is set and the routine 170 is terminated upon returning a value of Best as the distortion value associated with the optimal sequence of N codewords (step 216). If all K codewords have not been used as $C_i$, then the value of the index i is incremented by one (step 218). Processing then continues at step 188 using the next codeword $C_i$.

Figure 6:
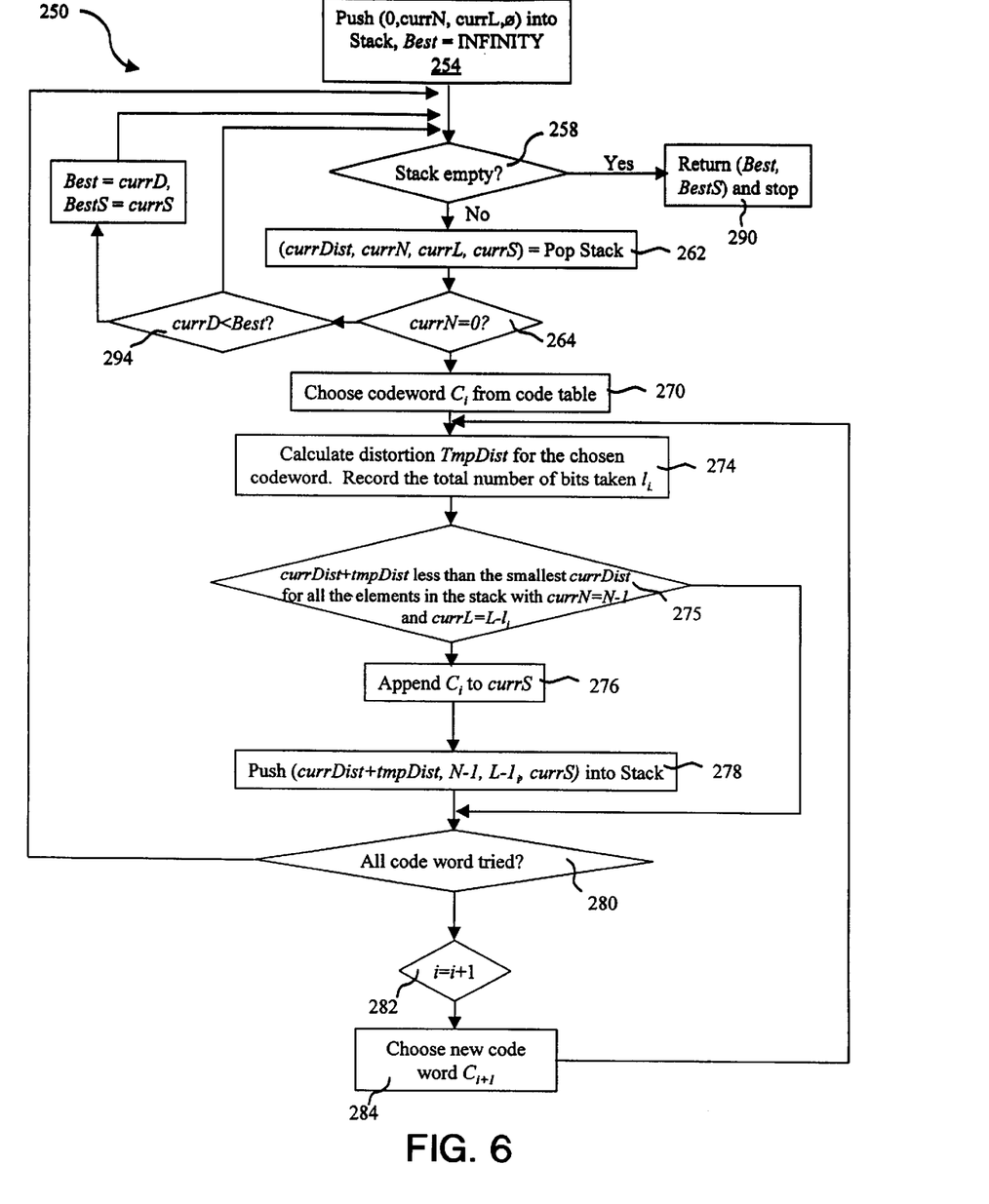
FIG. 6 is a flow diagram representative of a preferred non-recursive routine disposed to implement the dynamic soft decoding procedure of the present invention.

FIG. 6 is a flow diagram representative of a preferred non-recursive routine 250 disposed to implement the dynamic soft decoding procedure of the present invention. As in the case of FIG. 5, upon entering routine 250 it is assumed that all operations in FIG. 3 have been performed on the received packet header information except for step 166. The non-recursive routine 250 for determining D*(N, L) is executed using a memory stack having a plurality of stack elements. Each stack element includes three fields for holding corresponding values of the parameters (currDist, currN, currL, currS). As will be further described with reference to FIG. 6, the parameter currDist reflects an accumulated value of the applicable distance metric for a partially decoded sequence in which a particular codeword has been selected as the first codeword in the sequence. That is, the value of currDist is incremented in accordance with the applicable distance metric each time a new codeword is added to the partially decoded sequence. The parameter currN specifies the number of additional codewords remaining to be added to the partially decoded sequence, and the parameter currL reflects the remaining number of bits available to encode such additional currN codewords. In addition, the parameter currS consists of an aggregation of the N-currN codewords (consuming L-currL bits) which have been decoded as of the time when currN codewords remain to be decoded.

Since the routine 250 is non-recursive, it does not call itself (as does the recursive routine 170) to solve "intermediate" problems of the form D*(N-n, L-l). Rather, these intermediate problems are saved in the stack in a way facilitating evaluation of the expression of ultimate interest, D*(N, L). In this regard the stack is loaded in a "first-in, last-out" manner such that the (currDist, currN, currL, currS) parameters corresponding to the problem of ultimate interest, i.e., (0, N, L, φ) wherein φ denotes the empty string, are pushed into the stack first and popped from the stack last. This reflects an intention to decompose the problem of ultimate interest into a set of smaller, intermediate problems, each of which hypothesizes a different codeword as the first codeword in the decoded sequence.

As is indicated by FIG. 6, in an initialization step 254 the parameters (0, N, L, φ) are pushed into the stack and the parameter Best is assigned an infinite value. If the stack is determined not to be empty (step 258), then the parameters (currDist, currN, currL, currS) are popped from the stack (step 262) and are used as described below. If currN is not equal to zero (step 264), then the value of an index "i" is set to one (step 268) and a codeword $C_i$ is selected from a table of available codewords (step 270) to be the first codeword in a potentially optimal decoded sequence.

A value for the parameter TmpDist is then determined by comparing the bits of the selected codeword $C_i$ to the first $l_i$ bits in the header information of the received packet in accordance with the applicable distance metric, where $l_i$ is the bit length of the selected codeword $C_i$ (step 274). This bit length $l_i$ is also recorded in step 274. In step 275 it is determined whether the value of the expression currDist+ tmpDist is less than the value of $currDist_E$ associated with any other element E=($currDist_E$, $currN_E$, $currL_E$, $currS_E$) in the stack with $currN_E$=currN-1, and $currL_E$=currL-$l_i$. After appending $C_i$ to currS (step 276), the parameters (currDist+ TmpDist, currN-1, currL-$l_i$) are then pushed into the stack (step 278). In a step 280 it is determined whether all K available codewords have been used as the initial codeword $C_i$ in a potentially optimal decoded sequence (i.e., whether i is less than K). If not, the index i is incremented by one (step 282), and a new codeword $C_i$ is selected (step 284). Steps 274 and 278 are then repeated for each available codeword $C_i$, i=1, 2, ..., K, at which point the routine 250 returns to step 258.

If it is found that the stack is not empty (step 258) and if currN=0, then it is determined whether currDist is less than the current value of the parameter Best (step 294). If not, the routine 250 returns to step 258. If so, the value of the parameter Best is made equal to currDist, currS is saved as the current optimal decoding result BestS, and processing returns to step 258. If the stack is found to be empty at step 258, then the optimal codeword sequence BestS is returned together with the associated value D*(N,L) (represented by the parameter Best) of the applicable distance metric and the routine 250 terminates (step 262).

Although the above application has been described primarily in the context of a system in which the header information included within received video packets is decoded and then used to decode associated macroblock-based encoded video information, one skilled in the art can readily appreciate that the teachings of the present invention may be applied to the decoding of other packet formats. Thus the application is meant only to be limited by the scope of the appended claims.

What is claimed is:

1. A method for decoding encoded parameter data included within a packet containing encoded video data, said method comprising:

determining, from information within said packet, a bit length L of said encoded parameter data;

ascertaining a number N of codewords for use in decoding said encoded parameter data;

comparing candidate sequences of codewords to said encoded parameter data in accordance with a distortion metric, each of said candidate sequences including N codewords; and selecting an optimal sequence of N codewords from said candidate sequences based upon predefined criteria related to said distortion metric wherein said optimal sequence collectively has a number of bits equivalent to said bit length L and is usable to decode said encoded video data.

2. The method of claim 1 wherein said determining said bit length L includes calculating a number of bits between first and second markers included within said packet.

3. The method of claim 1 wherein and said comparing includes selecting a first codeword hypothesis and determining a first conditionally optimal sequence of N−1 of said codewords associated with said first codeword hypothesis.

4. The method of claim 3 wherein said comparing includes the selecting a second codeword hypothesis and determining a second conditionally optimal sequence of N−1 of said codewords associated with said second codeword hypothesis.

5. The method of claim 4 wherein said comparing includes determining a first error associated with said first conditionally optimal sequence and a second error associated with said second conditionally optimal sequence, and comparing said first error to said second error.

6. A device for decoding encoded parameter data included within a packet containing encoded video data, said device comprising:

means for determining, from information within said packet, a bit length L of said encoded parameter data;

means for ascertaining a number N of codewords for use in decoding said encoded parameter data;

means for comparing candidate sequences of codewords to said encoded parameter data in accordance with a distortion metric, each of said candidate sequences including N codewords; and means for selecting an optimal sequence of N codewords from said candidate sequences based upon predefined criteria related to said distortion metric wherein said optimal sequence collectively has a number of bits equivalent to said bit length L and is usable to decode said encoded video data.

7. The device of claim 6 wherein said means for determining said bit length L includes means for calculating a number of bits between first and second markers included within said packet.

8. The device of claim 6 wherein said means for comparing includes means for selecting a first codeword hypothesis and for determining a first conditionally optimal sequence of N−1 of said codewords associated with said first codeword hypothesis.

9. The device of claim 8 wherein said means for comparing includes means for selecting a second codeword hypothesis and for determining a second conditionally optimal sequence of N−1 of said codewords associated with said second codeword hypothesis.

10. The device of claim 9 wherein said means for comparing includes:

means for determining a first error associated with said first conditionally optimal sequence and a second error associated with said second conditionally optimal sequence, and means for comparing said first error to said second error.

11. A decoder for decoding a packet containing macroblocks of encoded video data wherein said packet includes encoded parameter data, said decoder comprising:

means for determining a bit length L of said encoded parameter data;

means for ascertaining a number N of codewords for use in decoding said encoded parameter data;

means for comparing candidate sequences of codewords to said encoded parameter data in accordance with a distortion metric, each of said candidate sequences including N codewords;

means for selecting an optimal sequence of N codewords from said candidate sequences based upon predefined criteria related to said distortion metric; and a decoding unit for decoding said macroblocks of encoded video data using said optimal sequence.

12. The decoder of claim 11 wherein said means for determining said bit length L includes means for calculating a number of bits between first and second markers included within said packet.

13. The decoder of claim 11 wherein said means for comparing includes means for selecting a first codeword hypothesis and for determining a first conditionally optimal sequence of N−1 of said codewords associated with said first codeword hypothesis.

14. A decoder for decoding encoded parameter data included within a header of a packet containing encoded video data, said decoder comprising:

a video bitstream decoder operative to (i) determine a bit length L of said encoded parameter data using information within said header, (ii) ascertain a number N of codewords for use in decoding said encoded parameter data, (iii) compare candidate sequences of codewords to said encoded parameter data in accordance with a distortion metric, each of said candidate sequences including N codewords, and (iv) select an optimal sequence of N codewords from said candidate sequences based upon predefined criteria related to said distortion metric; and an inverse quantizer module operatively connected to said video bitstream decoder.

15. The decoder of claim 14 wherein said optimal sequence collectively has a number of bits equivalent to said bit length L and is usable to decode said encoded video data, and wherein said video bitstream decoder is further operative to (i) calculate a number of bits between first and second markers included within said packet, and (ii) select a first codeword hypothesis and determine a first conditionally optimal sequence of N−1 of said codewords associated with said first codeword hypothesis.

16. A decoder for decoding a packet containing macroblocks of encoded video data wherein said packet includes encoded parameter data, said decoder comprising:

a video bitstream decoder operative to (i) determine a bit length L of said encoded parameter data using information within said header, (ii) ascertain a number N of codewords for use in decoding said encoded parameter data, (iii) compare candidate sequences of codewords to said encoded parameter data in accordance with a distortion metric, each of said candidate sequences including N codewords, and (iv) select an optimal sequence of N codewords from said candidate sequences based upon predefined criteria related to said distortion metric; and a decoding unit for decoding said macroblocks of encoded video data using said optimal sequence.

17. The decoder of claim 16 wherein said optimal sequence collectively has a number of bits equivalent to said bit length L and is usable to decode said macroblocks of encoded video data, and wherein said video bitstream decoder is further operative to calculate a number of bits between first and second markers included within said packet.

18. A data transmission system comprising:

an encoder for transmitting a packet containing encoded parameter data and encoded video data, said encoded parameter data being interposed between a first marker and a second marker included within said packet;

a decoder for receiving said packet and for decoding said encoded parameter data, said decoder being operative to (i) determine a bit length L of said encoded parameter data by comparing locations of said first marker and said second marker, (ii) ascertain a number N of codewords for use in decoding said encoded parameter data, (iii) compare candidate sequences of codewords to said encoded parameter data in accordance with a distortion metric, each of said candidate sequences including N codewords, and (iv) select an optimal sequence of N codewords from said candidate sequences based upon predefined criteria related to said distortion metric.

19. The data transmission system of claim 18 wherein said optimal sequence collectively has a number of bits equivalent to said bit length L and is usable to decode said encoded video data, and wherein said decoder is further operative to select a first codeword hypothesis and determine a first conditionally optimal sequence of N−1 of said codewords associated with said first codeword hypothesis.

\* \* \* \* \*